No. 653,350. Patented July 10, 1900.
F. KEPP.
GEAR MOLDING MACHINE.
(Application filed Mar. 6, 1900.)
(No Model.) 5 Sheets—Sheet 1.

Fig.1.

Witnesses

Ferdinand Kepp, Inventor
By
Attorney

No. 653,350. Patented July 10, 1900.
F. KEPP.
GEAR MOLDING MACHINE.
(Application filed Mar. 6, 1900.)

(No Model.) 5 Sheets—Sheet 2.

Ferdinand Kepp, Inventor

Witnesses

No. 653,350.  
F. KEPP.  
GEAR MOLDING MACHINE.  
(Application filed Mar. 6, 1900.)

Patented July 10, 1900.

(No Model.)

Witnesses  
Jas. H. McCathran

Ferdinand Kepp, Inventor  
By  
E. G. Siggers  
Attorney

THE NORRIS PETERS CO., PHOTO-LITHO., WASHINGTON, D. C.

UNITED STATES PATENT OFFICE.

FERDINAND KEPP, OF ALLEGHENY, PENNSYLVANIA.

GEAR-MOLDING MACHINE.

SPECIFICATION forming part of Letters Patent No. 653,350, dated July 10, 1900.

Application filed March 6, 1900. Serial No. 7,487. (No model.)

*To all whom it may concern:*

Be it known that I, FERDINAND KEPP, a citizen of the United States, residing at Allegheny, in the county of Allegheny and State of Pennsylvania, have invented a new and useful Gear-Molding Machine, of which the following is a specification.

This invention relates to gear-molding machines of the type designed for preparing the molds for gear-wheels, especially of the larger type; and it has for one object to provide a double-acting machine of this character having novel and improved means for operating upon molds for external or internal gears of varying sizes.

To this end the invention contemplates an improved gear-molding machine capable of being set with great nicety to the radius of the wheel to be molded and having means for operating upon opposite sides of the mold or only upon one side of the mold at a time, at the option of the operators.

A further object of the invention is to equip the machine with separate sets of patterns designed, respectively, for external and internal gears and to associate therewith common adjusting mechanism, whereby the same adjusting mechanism may be employed for properly setting the patterns for internal gears, as well as those for external gears, besides arranging the patterns in relatively-opposite positions, whereby the machine will be double-acting, thus greatly facilitating the preparation of the molds and enabling the same to be completed in a much shorter time than has heretofore been possible.

Another object of the invention is to provide the machine with pattern-carrying mechanism not only capable of providing for the individual transverse and vertical adjustment of the different patterns, but also shiftable as an entirety or bodily into and out of an operative position to permit of the removal and replacing of the flasks, while also capable of an intermittent rotation relatively to the flasks, whereby the patterns may be carried around within the flasks as the teeth of the gearing are progressively impressed in the sand during the mold-forming operation, thus permitting of the flasks being supported upon a stationary table or tables.

A further object of the invention is to provide an improved table-support for the flasks which permits of flasks of varying diameters being operated upon by the patterns besides adapting the machine for supporting in proper position flasks of different depths, as well as bottomless flasks or those simply consisting of an open rim or frame.

With these and many other objects in view, which will more readily appear as the nature of the invention is better understood, the same consists in the novel construction, combination, and arrangement of parts hereinafter more fully described, illustrated, and claimed.

The fundamental features of the invention are necessarily susceptible to a wide range of modification without departing from the spirit or scope thereof; but the preferred embodiment of the invention is shown in the accompanying drawings, in which—

Like numerals of reference designate corresponding parts in the several figures of the drawings.

In carrying out the invention there is employed a base or bed 1, constructed of a sufficient size to support thereover one or more flask-tables 2; but inasmuch as it would be merely a duplication to illustrate a plurality of flask-tables associated with the base 1 there is shown in the drawings only one of these tables, and the same essentially consists of a circular body of a sufficient size to sustain thereon the ordinary sizes of flasks 3 usually employed for molding gear-wheels. No special type of flask is required for use in connection with the machine, as said flask may be of any approved construction designed to have packed therein the sand body 4, into which is impressed the tooth formation for either external or internal gears; but in all of the ordinary types of molding-flasks for gear-wheels the same are provided with perforated bottom portions which provide for the proper venting of the molds and at the same time permit the sand to work out of the same. In order to provide for facilitating the cleaning of the flask-table 2 from such sand as may fall thereon, the said table is provided in the upper face thereof with a concentric series of sand-grooves 5, which grooves have formed in their bottoms or bases at suitable intervals the discharge-openings 6, through which the sand escapes and falls to the floor. By reason of the grooved formation of the flask-table 2 it is obvious that when a flask is removed therefrom the said table may be quickly and thoroughly swept clean of the sand, and another advantage of this construction resides in the fact that the grooves permit of forming the flask-table with a flat upper side upon which may be directly supported the ordinary bottomless flasks, or those simply consisting of an open ring or frame. With flasks of this character, which are ordinarily of sizes to lie within the circumference of the flask-table, the flat upper surface of the table will constitute a bottom for the flask, with the sand-grooves 5 exposed therein, so that the flask may be swept clean of the sand. The arrangement of said grooves 5 in concentric series adapts the table for use with bottomless flasks of different sizes. In the ordinary use of the flask-supporting table 2 the perforated bottom of the flask 3 is supported on the usual spacing-rib $6^a$, projecting from the upper side of the table at or contiguous to the periphery thereof.

Figure 5:
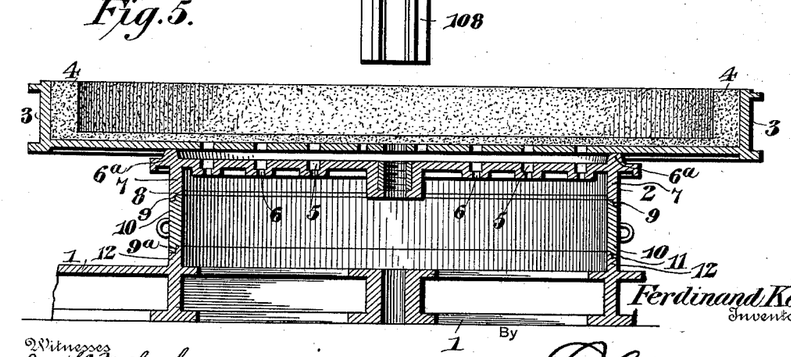
Fig. 5 is an enlarged detail sectional view of the flask-table and the means of supporting the same on the base.
Figure 6:
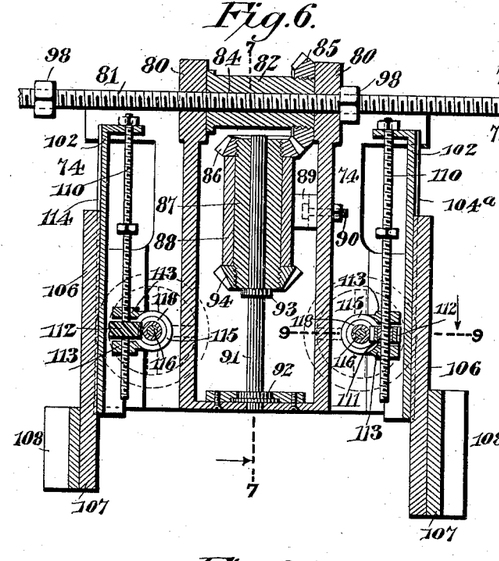
Fig. 6 is an enlarged vertical sectional view of one of the pattern-carriages supported by the guide-arm extensions of the pattern-carrying frame.
Figure 7:
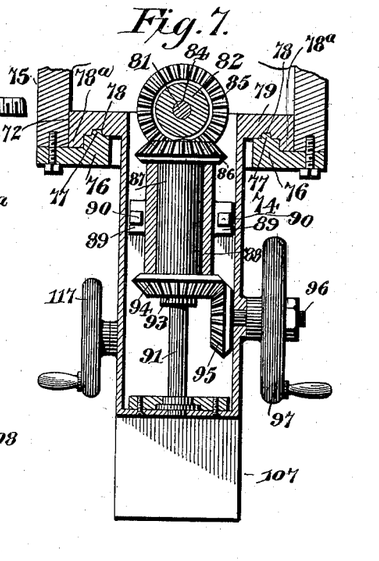
Fig. 7 is a vertical sectional view on the line 7 7 of Fig. 6, also showing the slide connection between the carriage and the guide-arm extensions supporting the same.

In addition to the grooved formation of the flask-supporting table 2 the present invention contemplates providing the table with a pendent supporting-flange 7, provided with a lower rabbeted edge 8, which is adapted to interlock with the correspondingly-rabbeted edge 9 of the removable elevating-rim 10, fitting the correspondingly-rabbeted edge 11 of the rest-flange 12, arising from the upper side of the base 1. The elevating rim or annulus 10 is rabbeted at both edges, as indicated at 9 and $9^a$, so as to register and interlock with the correspondingly-rabbeted edges 8 and 11 of the table-flange 7 and the rest-flange 12 when interposed between these two flanges in the position shown in Fig. 5 of the drawings. At this point it may be explained that when flasks of ordinary shallow depths are to be operated upon the elevating rim or annulus 10 is placed upon the rest-flange 12 of the base and the flask-table fitted upon the rim or annulus, thereby elevating the table a sufficient distance above the base to facilitate the proper handling of the flask. When flasks of considerable depths are being operated upon, the elevating rim or annulus 10 is lifted out of position and the table 2 set down upon the rest-flange 12 of the base, thus lowering the table sufficiently to admit of the proper preparation of the mold through the medium of the patterns hereinafter more fully described.

To provide for sustaining and guiding the entire pattern-carrying mechanism which co-operates with the flask or flasks supported upon the table or tables, there is employed a pair of elevated horizontal supporting-beams 13, which are sustained in their elevated positions above the base 1 and the table or tables through the medium of a plurality of sustaining-columns 14, bolted or otherwise firmly secured at their lower ends to the base 1 and similarly fastened at their upper ends to the elevated supporting-beams 13 and to such cross-beams 15 as may be found necessary to properly brace and strengthen the superstructure, and at this point it may be observed that the elevated supporting-beams 14 may be lengthened where a plurality of flask-supporting tables are arranged upon the base 1; but for illustrative purposes the beams are shown as of a length commensurate with the size of a single flask-supporting table to provide for the proper hanging or support of the pattern-carrying mechanism with reference thereto. The elevated supporting-beams 13 are arranged in opposite parallel relation and are provided therein with longitudinal ways 16, in which are arranged the rotary longitudinal shifting-screws 17. The said shifting-screws 17 extend lengthwise of the supporting-beams 13 from end to end thereof and are suitably journaled at their ends in suitable bearings 18 at the extremities of the supporting-beams, whereby the screws will be held for a fixed rotation with reference to the movable top hanger-frame 19, which is supported for a sliding movement upon the said supporting-beams 13. The said rotary shifting-screws 17 may be held against longitudinal displacement by suitable fastenings $19^a$ at one end thereof and are adapted to accommodate for a traveling movement thereon the running nuts 20, bolted or otherwise suitably fastened to the movable top hanger-frame 19 and working in the longitudinal ways 16 of the supporting-beams 13. The said rotary shifting-screws 17, which have the nut connections with the movable hanger-frame 19, have fitted to one end thereof the worm-gears 21, with which mesh the worms 22 on the opposite extremities of the transverse worm-shaft 23, journaled in suitable bearings provided on oppositely-arranged sustaining-columns and having mounted thereon the fast and loose pulleys 24 and 25, respectively, the said loose pulleys being adapted to normally receive thereon the reversely-moving driving-belts 26 and 26ª, either of which is adapted to be shifted onto the fast pulley 24 to provide for driving the worm-shaft 23 in either direction, according to the direction of movement it is desired to impart to the top hanger-frame 19, which hanger-frame carries the entire pattern-carrying mechanism, as will be presently explained.

The top hanger-frame 19, which is movable longitudinally of the supporting-beams 13, is preferably of a spider or skeleton formation and is provided with a plurality of extended slide-arms 27, arranged in oppositely-located pairs overhanging the elevated supporting-beams 13, and each of which slide-arms 27 has bolted or otherwise suitably fastened thereon one of the running nuts 20. By reason of the arrangement of the slide-arms 27 in opposite pairs a thorough bracing of the top hanger-frame 19 with reference to the supporting-beams 13 is secured, while at the same time provision is made for a steady and uniform adjustment of the said frame as the oppositely-located shifting-screws 17 are rotated in unison. The movable or shiftable top hanger-frame 19 is preferably a single casting and is provided at the central portion thereof with a pendent elongated cylindrical bearing-shell 28, which is formed with an inner extended bearing-surface 29 and preferably is strengthened or braced by means of a plurality of radially-arranged brace-webs 30, formed integral with the spider-frame 19 and externally of the cylindrical bearing-shell 28. The said cylindrical bearing-shell 28 constitutes an enlarged and extended bearing for the cylindrical journal or journal-drum 31 of the revoluble pattern-carrying frame 32, which is suspended from the shiftable hanger-frame 19, so as to move bodily therewith, while at the same time being capable of an independent and intermittent rotary movement. The pattern-carrying frame 32 has the cylindrical journal or journal-drum 31 formed integral with the main portion thereof and arranged centrally between its ends, said cylindrical journal or journal-drum 31 also projecting upwardly from the upper side of the frame 32 and completely registering within the shell 28 to provide a large journal-support for the pattern-carrying frame, which positively obviates any tilting or undue play of the said frame, while at the same time permitting of the free rotation thereof. To maintain the cylindrical journal of the pattern-carrying frame in proper registering engagement with the bearing-shell 28 of the hanger-frame, the said cylindrical journal-drum 31 has bolted or otherwise suitably fastened to the upper end thereof a retaining-ring 33, which overhangs the top edge of the bearing-shell 28 and prevents the downward displacement of the journal or journal-drum 31, while at the same time not interfering with the free rotation thereof, besides providing means whereby the detachment of the ring 33 from the upper end of the journal 31 will enable the pattern-carrying frame to be removed and replaced, as conditions may require.

In addition to the retaining-ring 33, detachably fitted to the upper side or end of the journal 31, there is associated with the said journal of the pattern-carrying frame a central king-bolt 34, which is mounted at its lower end in the central bearing-eye 35, formed integral with the upper side of the journal or journal-drum 31, and the upper end of said bolt 34 is fitted in the hub-collar 36 at the center of the spider hanger-frame 19. The king-bolt 34 necessarily strengthens and reinforces the journal for the pattern-carrying frame, besides supporting some of the weight thereof, and a further advantage of the king-bolt 34 is that in the event of any looseness of the parts the same may be readily tightened to the proper working fit by the adjustment of the said bolt 34, as will be readily understood by those familiar with the art.

Figure 1:
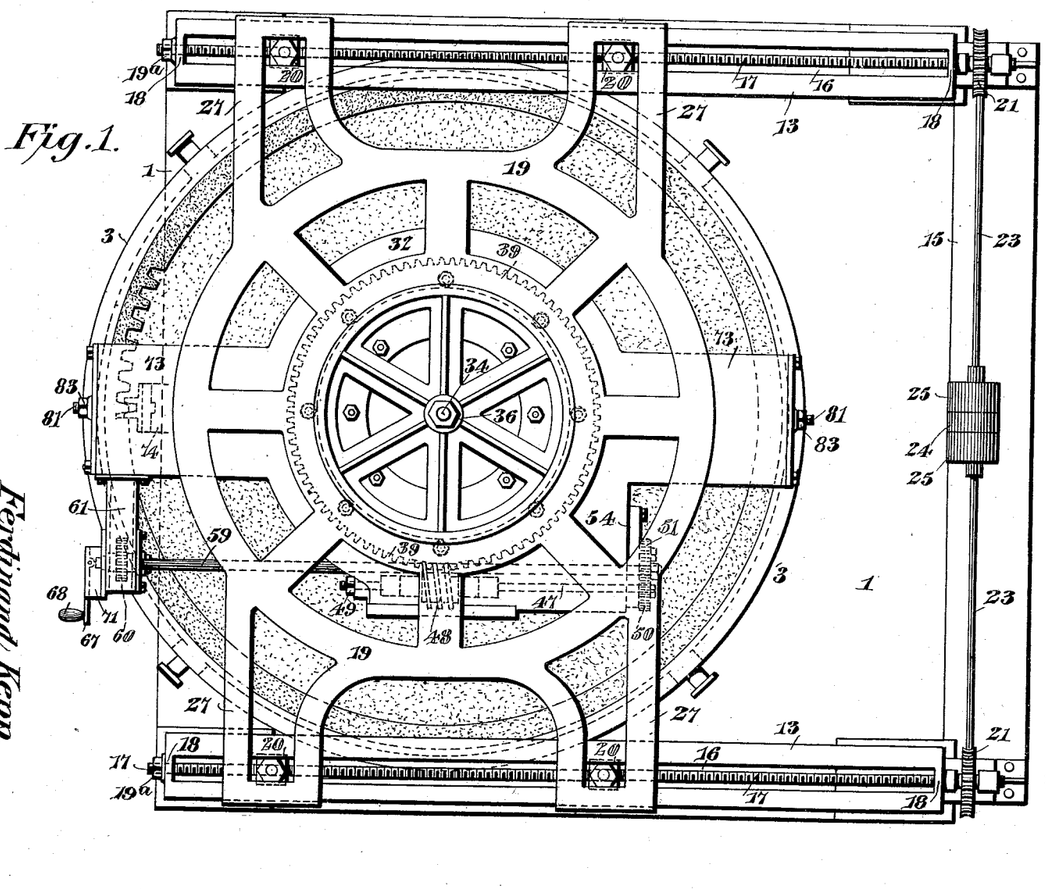
Figure 1 is a top plan view of a gear-molding machine constructed in accordance with the present invention.
Figure 2:
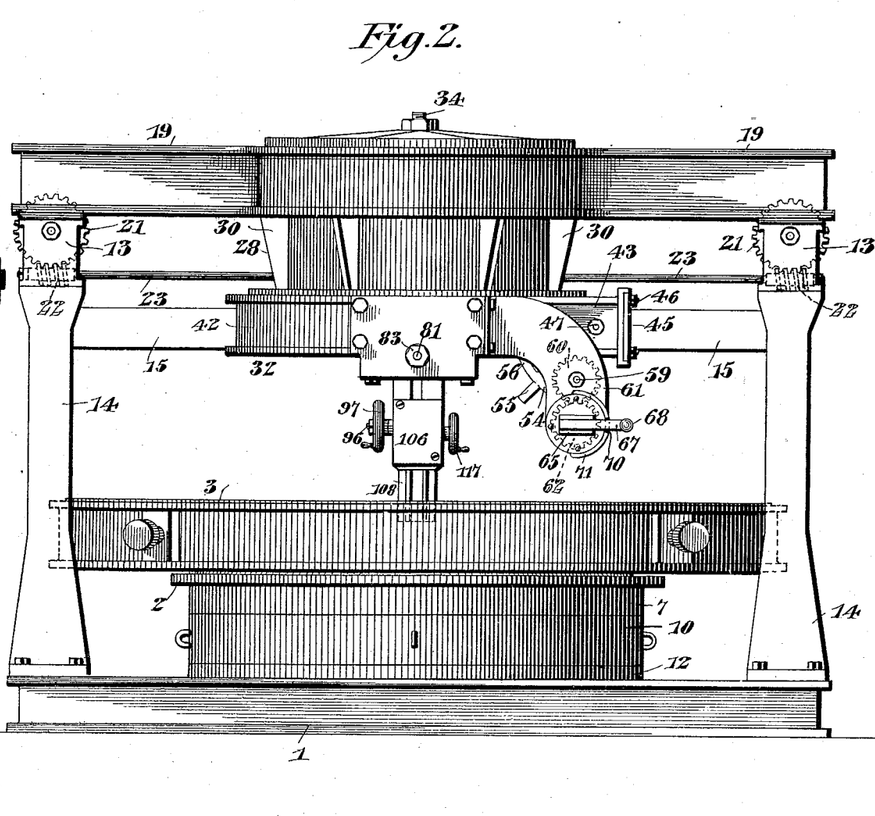
Fig. 2 is a front elevation of the machine.
Figure 3:
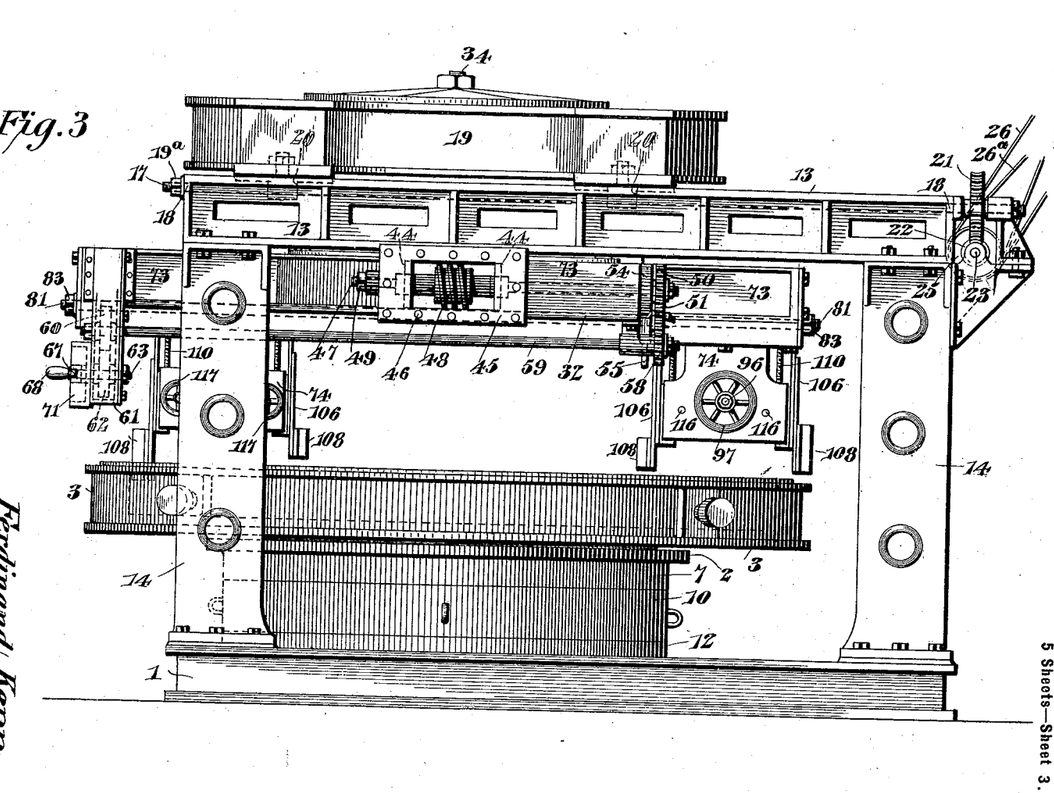
Fig. 3 is a side elevation of the machine.
Figure 4:
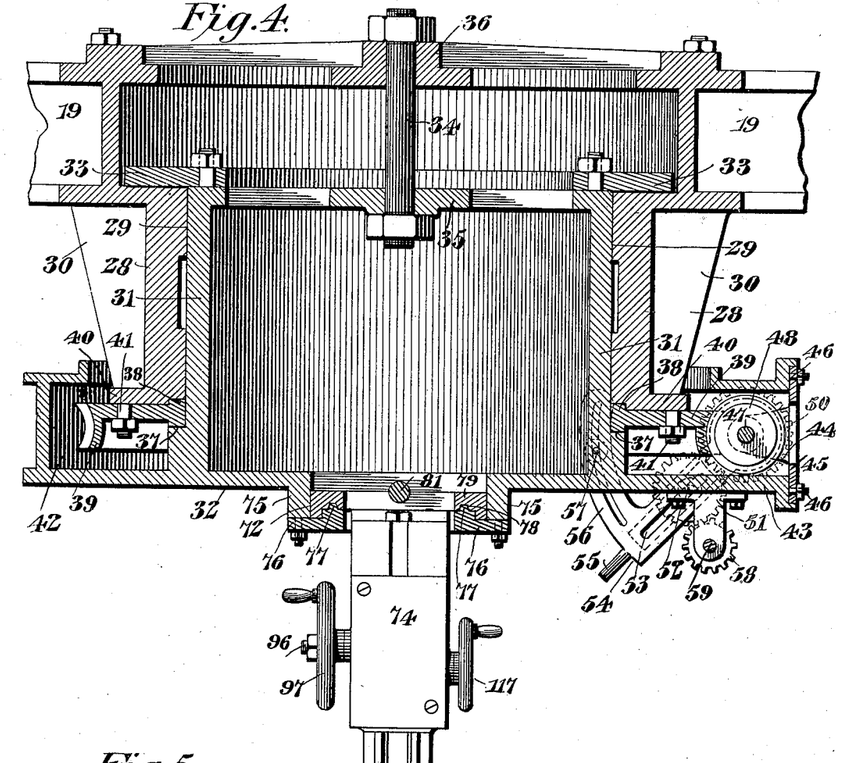
Fig. 4 is an enlarged vertical sectional view of the central portion of the removable hanger-frame and the revoluble pattern-carrying frame supported thereby and journaled thereto.

The lower end portion of the cylindrical journal or journal-drum 31 of the pattern-carrying frame 32 is turned to an exterior shoulder 37, adapted to have a bearing fit within the hub-ring 38 of the stationary worm master gear-wheel 39, which is rigidly fastened to the foot-flange 40 at the lower end of the bearing-shell 28 by means of the bolts 41 or other equivalent fastening means. It will thus be seen that the stationary master gear-wheel 39 also in a measure constitutes a part of the extended bearing for the cylindrical journal or journal-drum 31 of the pattern-carrying frame, and the said master gear-wheel is arranged or housed entirely within the circular gear case or boxing 42, formed integral with the pattern-carrying frame 32 at the central portion thereof and encircling the journal-drum 31, also forming a part of the pattern-carrying frame. The circular gear case or boxing 42, like the journal-drum 31, arises from the upper side of the pattern-carrying frame 32 and not only houses or accommodates therein the stationary worm master gear-wheel 39, but is also provided at one side with a bearing-bracket extension 43, in which is arranged a bearing-bracket 44, the supporting plate or base 45 of which bracket is detachably held to the outer side of the extension 43 by means of the bolts 46 or equivalent fastenings, as plainly shown in Fig. 4 of the drawings. The bearing-bracket 44 is thus detachable from the gear case or boxing 42 of the pattern-carrying frame 32 and has journaled therein the worm-gear feed-shaft 47, which carries within the bearing-bracket extension 43 a traveling feed-worm 48, meshing with the peripheral teeth of the worm master gear-wheel 39 and adapted to travel around the periphery of said wheel to provide for the intermittent revoluble feed of the pattern-carrying frame in the manner hereinafter more fully explained.

The worm feed-shaft 47 is extended through the bearing-bracket extension 43 of the pattern-carrying frame and is fitted at one end with the retaining-nut 49 to prevent longitudinal displacement and at its other end with a gear-wheel 50, adapted to mesh with an idler-gear 51, carried by a journal-bolt 52, longitudinally adjustable within the slot 53, formed in the gear-carrying lever 54, pivotally mounted at one end upon a suitable support, which may be the worm feed-shaft 47, as shown in the drawings, and provided at its other end with a handle 55. The said gear-carrying lever 54 is also provided with a slotted segment 56, extended from one side thereof and adapted to receive a binding screw or bolt 57, fitting in the adjacent portion of the pattern-carrying frame. The idler-gear 51 meshes with a pinion 58, mounted on one end of an operating-shaft 59, the opposite end of which shaft carries a transmitting-gear 60, mounted inside of a tubular hanger-bracket 61, offset from one side of the pattern-carrying frame 32, at one end thereof, and hanging in a pendent position to dispose the hand operating device for the shaft 59 within convenient reach of the operator. The said transmitting-gear 60, within the tubular pendent hanger-bracket 61, meshes with a drive-gear 62, also housed within the bracket 61 at the lower end of said bracket and mounted on a short shaft 63, journaled transversely of the said bracket 61 in a suitable bearing 64 and having mounted on the front end thereof an operating-head 65, in which is pivotally mounted, as at 66, a handle-lever 67. The said handle-lever 67 is provided at one end with a hand-grip 68 and is arranged to have its free end at the opposite side of the pivot 66 bear upon one end of a locking-spring 69, seated in a suitable socket formed in the operating-head 65 and normally exerting an outward tension to provide for holding the long arm of the lever 67 interlocked with an arresting-shoulder 70, formed in the index-flange 71, projecting at the front side of the pendent hanger-bracket 61. When it is desired to rotate the entire pattern-carrying frame the necessary distance, the operator draws out the handle-lever 67 from the arresting-shoulder 70 and swings the same around until it is carried by the index-flange 71 into reëngagement with said shoulder. This movement of the handle-lever 67 transmits motion from the gears 62 and 60 to the operating-shaft 59 and thence, through the gears 58, 51, and 50, to the worm feed-shaft 47, which feed-shaft turns the feed-worm 48, and the latter advances upon the worm master gear-wheel 39 the requisite distance, according to the size of the wheel being molded, and when it is desired to change the amplitude of rotary movement of the pattern-carrying frame upon a single revolution or movement of the handle-lever 67 to conform to the pitch of the wheel being molded the relative sizes of the gears 58, 51, and 50 may be changed. This is readily accomplished by first loosening the journal-bolt 52 to move the idler-gear 51 out of engagement with the gear-wheel 50, whereupon by loosening the binding screw or bolt 57 the gear-carrying lever 54 may be swung away from the pinion 58, thus permitting of the necessary relative sizes of gears being changed. This construction adapts the machine for ready adjustment and also adapts the same to molding wheels of varying pitch.

The revoluble pattern-carrying frame 32, in addition to the features already described, is provided at its under side with a longitudinal slideway 72, which not only extends transversely beneath the central portion of the frame, but is continued along the guide-arm extensions 73, projecting from opposite sides of the frame in the same longitudinal plane and respectively providing for the sliding support of the oppositely-arranged pattern-carriages 74. The said longitudinal slideway 72 essentially comprises a pair of pendent parallel flanges 75, to the lower edges of which are bolted or otherwise suitably fastened the horizontal inwardly-projecting guide-strips 76, which extend inwardly from their point of attachment to the flanges 75 and are provided at their inner edges with the upturned guide ribs or tongues 77, which have a loose interlocking engagement with the grooved under faces 78 of the slide-heads 79 at the upper ends of the pattern-carriages 74. The upper end portions of the oppositely-located pattern-carriages 74 extend up into and travel within the longitudinal spaces or ways between the strips 76 of the slideway 72, and the slide-heads 79 at the upper ends of the said carriages essentially consist of outwardly-disposed horizontal flanges 78$^a$, having their grooved under faces 78 overhanging and slidably engaging with the ribs or tongues 77 of the said guide-strips 76, thereby providing for a thorough bracing of the pattern-carriages at the opposite sides thereof and positively preventing lateral or side play thereof during the operation of the machine. The construction described constitutes the preferred manner of slidably supporting the pattern-carriages 74 from the guide-arm extensions 73 of the pattern-carrying frame; but it will of course be understood that any equivalent sliding connection accomplishing the same purpose may be substituted without departing from the spirit or scope of the invention. By reason of the construction described it will be seen that the oppositely-arranged pattern-carriages 74 are pendent or hang from the under side of the pattern-carrying frame 32 and are capable of a sliding movement longitudinally of the said frame, not only with reference to the guide-arm extensions 73 thereof, but also beneath its intermediate portion, as may be seen from Fig. 4 of the drawings, thus insuring an amplitude of movement for the pattern-carriages, which adapts the same not only for external gears and internal gears, but also for operating upon molds of varying sizes.

Both of the pattern-carriages and the mechanisms and elements associated therewith are duplicates in construction, so a specific description of one will suffice for the other. It will be seen by reference to the drawings that each of the pattern-carriages 74 is in the form of a hollow boxing provided with a pair of upstanding abutment-arms 80, perforated to loosely receive therethrough the stationary-carriage feed-screw 81 and adapted to support therebetween and hold against longitudinal displacement a revoluble-carriage feed-nut 82. The said stationary-carriage feed-screw 81 is arranged longitudinally within the lower portion of the pattern-carrying frame 32 and extends longitudinally thereof from end to end, being bolted at its extremities, as at 83, to the extreme outer ends of the guide-arm extensions 73 of the said frame. The stationary-carriage feed-screw 81 accommodates for traveling movement thereon the carriage feed-nut 82 of each carriage, and each of said feed-nuts 82 is in the form of a cylindrical bushing having a threaded bore 84 working upon the feed-screw 81 and having screwed or otherwise suitably fastened thereon, preferably at one end, a miter gear-wheel 85, which meshes with a similar horizontally-disposed gear-wheel 86, preferably screwed or threaded upon the upper end of a rotary gear-carrying bushing 87, which is journaled within a cylindrical bearing-sleeve 88, having brackets 89 bolted, as at 90, to an interior fixed part of the carriage. The said gear-carrying bushing 87 is also loosely mounted upon an upstanding supporting-spindle 91, having a collar 92 at its lower end supported in the bottom of the carriage-casing and held stationary therein, and at an intermediate point the said upright supporting-spindle 91 is provided with a rest-collar 93, which provides a support for the gear-carrying bushing 87, so as to relieve the miter-gears carried thereby from undue friction upon the ends of the bearing-sleeve 89. In addition to the miter gear-wheel 86, screwed or threaded upon the upper end thereof, the said bushing 87 has similarly fitted upon its lower end a like gear 94, which meshes with a beveled gear-wheel 95 at the inner end of a short carriage-operating shaft 96, upon the exposed outer end of which shaft is mounted the carriage-controlling hand-wheel 97, which is arranged at one side of the carriage, exterior thereto and within convenient reach of the operator.

In connection with the abutment-arms 80, which hold therebetween the feed-nut 82 of each carriage, there is associated a pair of adjustable stops 98, adjustably mounted upon the feed-screw 81, respectively beyond the opposite sides of the said abutment-arms 80, and which are adapted to be adjusted to set positions, so as to restrict the play of the carriage to a definite movement corresponding to the pitch of the wheel being operated upon, so that the pattern impressions in the sand will be made with absolute exactness at all points within the mold, as will be readily recognized by those familiar with the art.

Figure 8:
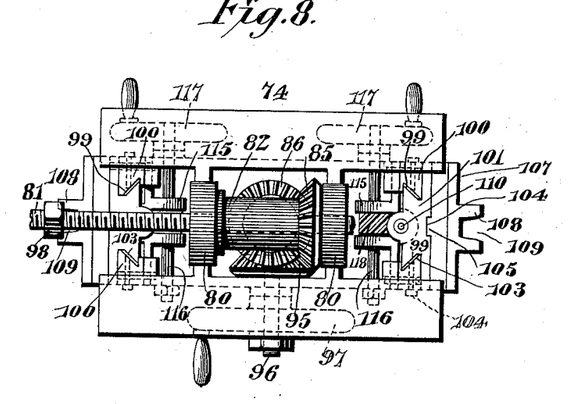
Fig. 8 is a top plan view of the construction shown in Fig. 6.
Figure 9:
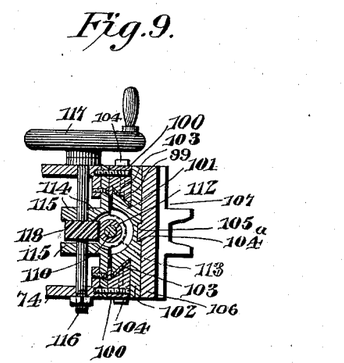
Fig. 9 is a detail sectional view on the line 9 9 of Fig. 6.
Figure 10:
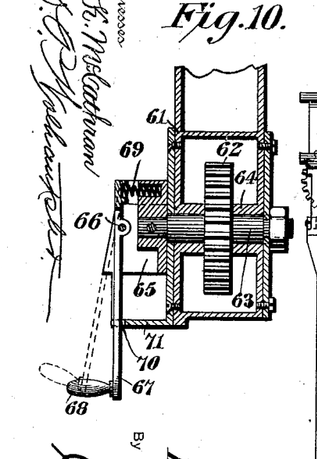
Fig. 10 is an enlarged detail sectional view of the hand operating device for imparting the intermittent rotation or revolution to the pattern-carrying frame which sustains and carries the patterns and the entire adjusting mechanism associated therewith.

Each pattern-carriage 74 is provided at the inner and outer sides thereof with vertical dovetailed guideways 99, consisting of a pair of oppositely-arranged guide-strips 100, screwed, bolted, or otherwise suitably fastened within the casing at or contiguous to the inner and outer sides thereof and grooved to constitute dovetailed ways which slidably receive the correspondingly-shaped tongues 101 at the inner sides of the vertically-adjustable pattern-holding slides 102, and to provide for taking up wear and adjusting the parts to a steady movement wear or liner plates 103 are arranged in the dovetailed ways 99 and adjusted against the slide-tongues 101 by means of the adjusting or regulating screws 104, mounted in the sides of the carriage-casing and working in transverse threaded openings formed in the strips 100, constituting the dovetailed guideways. This construction is duplicated at both the front and rear sides of each carriage-casing, and each of the vertically-adjustable pattern-holding slides 102 is provided in the outer side thereof with a longitudinally-grooved seat $104^a$, which receives therein the retaining-tongue 105, formed at one side of the attaching-arm 106 of the pattern-section 107, said attaching-arm 106 of the pattern-section 107 being fastened to the outer side of the pattern-holding slide 102 by screws, bolts, or any suitable means which provides a rigid connection, while at the same time permitting of a ready separation of the parts. The patterns or pattern-sections 107 are accurately formed to the pitch and shape of the teeth of the wheel to be molded and are usually constructed with two half-teeth 108, with a complete interdental space 109, which when pressed into the sand body of the mold presses out into the configuration of two half-teeth and a complete intervening space. By reason of arranging the pattern at both the front and rear sides of the pattern-carriages 74 it will be observed that the patterns at the outer sides of the two carriages can be used singly or at the same time for external gear-work, while those at the inner sides of the carriages may be utilized in the same manner for internal gearwork; but all of the patterns have an independent individual adjustment whereby the same may be adjusted independently of all of the others, and to provide for this individual adjustment of the patterns the holding-slide 102 for each pattern has secured thereto within the carriage a vertically-arranged adjusting-screw 110. The adjusting-screw 110 for each pattern-holding slide is arranged in parallelism to said slide at the inside thereof and is adapted to work through a threaded bushing 111, fitted inside of the feed-gear 112, mounted between a pair of horizontal guide-ears 113, formed integral with a gearing-bracket 114, mounted in a fixed position within the carriage-casing, and also provided in a plane at right angles to the guide-ears 113 with a pair of bearing-lugs 115, in which is journaled a horizontal pattern-operating shaft 116. This pattern-operating shaft 116, which is associated with each pattern, extends transversely across the carriage-casing and has mounted on one end thereof outside of the casing a pattern-controlling hand-wheel 117, which is disposed at the opposite side of the carriage-casing from the carriage-controlling hand-wheel 97, as plainly illustrated in Fig. 8 of the drawings. Each pattern-operating shaft 116 has mounted thereon between the bearing-lugs 115 the gear-wheel 118, meshing with the corresponding right-angularly-disposed feed-gear 112, and at this point it may be explained that the gears 112 and 118 are what are known as "spiral gear-wheels," being cut to forty-five degrees in spiral form and providing for a rapid movement of the adjusting-screw 110 and a consequent rapid vertical adjustment of the pattern. The two pattern-controlling hand-wheels 97 for each carriage are disposed at the same side thereof, so that an operator standing in front of either carriage may grasp the carriage-controlling hand-wheel 97 with one hand and one of the pattern-controlling hand-wheels with the other hand, so that the bodily feed or adjustment of the carriage, as well as the vertical adjustment of either of the patterns supported thereby, may be accomplished with facility and despatch.

In the operation of the machine, prior to the positioning of the flask upon the flask-supporting table 2, the shifting-screws 17 are set in motion so as to shift the top hanger-frame 19 to a position beyond the vertical plane of the table, so that by means of the usual hoisting apparatus the flask may be properly positioned upon the table. After this has occurred the shifting-screws 17 are again set in motion to return the shiftable top hanger-frame 19 to the proper position above the flask, and by manipulating the carriage-controlling hand-wheels 97 the pattern-carriages may be moved to their extreme positions, according to the radius of the wheel to be molded, and the adjustable stops 98 set at such extreme positions, so as to limit the play of the carriages commensurate to the radius of the wheel. When these adjustments have been made, the pattern which is to be brought into play is lowered into the mold by turning the controlling-wheel 117 associated with such pattern, the turning of which wheel provides for turning the spiral gears 112 and 118, thus causing the adjusting-screw 110 for the pattern to feed downward and carrying the pattern-holding slide 102 in a downward direction. When the pattern has been lowered in this manner into the mold and opposite the sand body to be operated upon, the carriage-controlling hand-wheel 97 is then manipulated to transmit motion to the carriage feed-nut 82, thereby causing the said nut to travel upon the stationary-carriage feed-screw until the motion is arrested by one of the adjustable stops 98, at which point the pattern will have made a complete impression in the sand body of the mold. The movement of the carriage-controlling hand-wheel is reversed to carry the pattern away from the sand, and then the hand-lever 67 is operated in the manner herein described to provide for a partial rotation of the entire pattern-carrying frame to bring the pattern opposite the next portion of the sand body to be impressed. This operation continues until the entire periphery of the mold is impressed with the teeth of the gear to be molded, and at this point it may be further explained, as before stated, that opposite sides of the mold may be operated upon at the same time to expedite the completing of the mold, thus making the machine double-acting and greatly shortening the time of preparing the mold.

From the foregoing it is thought that the construction, operation, and many advantages of the herein-described gear-molding machine will be readily apparent to those familiar with the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. In a gear-molding machine, a stationary table, an elevated non-rotatable support, a revoluble pattern-carrying mechanism having a frame suspended from the under side of the said non-rotatable support and having a journal connection therewith, and pattern-carriages suspended from the said frame, substantially as set forth.

2. In a gear-molding machine, an elevated non-rotatable support shiftable in a rectilinear path, a revoluble pattern-carrying mechanism suspended from the under side of said non-rotatable support and having a journal connection therewith, and means for mechanically rotating the said pattern-carrying mechanism upon its journal connection with the support as an axis, substantially as set forth.

3. In a gear-molding machine, a table, pattern-carrying mechanism having a frame carrying separate sets of oppositely-arranged patterns, each of said sets including a pair of vertically-movable patterns for internal and external work, said patterns being arranged in corresponding positions respectively at the inner and outer sides of the supports therefor, adjusting mechanism for the individual patterns, and means for causing the oppositely-located similar patterns to operate upon diametrically-opposite sides of the mold at one operation, substantially as set forth.

4. In a gear-molding machine, the stationary table, an elevated shiftable support, and a revoluble pattern-carrying mechanism arranged above the table and suspended from the support, said mechanism having means for operating upon diametrically-opposite sides of a mold at one operation, substantially as set forth.

5. In a gear-molding machine, a table, a pattern-carrying mechanism having opposite sets of patterns arranged to operate at opposite sides of the mold, each of said sets including a pair of patterns for internal and external gears, said patterns being arranged in corresponding positions respectively at the inner and outer sides of the supports therefor, similar individual adjusting mechanism for each pattern, and means for causing a relative rotation between the table and the pattern-carrying mechanism, substantially as set forth.

6. In a gear-molding machine, the combination of a stationary table, a revoluble pattern-carrying mechanism arranged to swing over the table, and carrying separate sets of oppositely-arranged patterns, each of said sets including a pair of vertically-movable patterns for internal and external work, said patterns being arranged in corresponding positions respectively at the inner and outer sides of the supports therefor, and similar individual adjusting mechanism for each pattern.

7. In a gear-molding machine, an elevated shiftable support, a revoluble pattern-carrying mechanism suspended from the under side of said support and having a journal connection therewith, said mechanism also having separate sets of patterns, each of said sets including patterns for internal and external gears, and similar individual adjusting mechanism for each pattern, substantially as set forth.

8. In a gear-molding machine, the combination with the stationary table, of an elevated support, the revoluble pattern-carrying frame having a journal connection with said support and suspended beneath the same, and a pair of pattern-carriages adjustably supported by the said frame and carrying individually-adjustable patterns, said carriages being arranged at diametrically-opposite sides of the point of support for the pattern-carrying frame, substantially as set forth.

9. In a gear-molding machine, a table, an elevated support, a pattern-carrying frame pivotally suspended and arranged to swing horizontally above the table, a pair of pattern-carriages adjustably supported by said frame and arranged to work at diametrically-opposite sides of the point of pivotal support therefor, each of said carriages carrying a pair of individually-adjustable patterns, respectively for internal and external work, and means for causing a relative rotation between the pattern-carrying frame and the table, substantially as set forth.

10. In a gear-molding machine, the stationary frame, an elevated horizontal hanger mounted upon said stationary frame and shiftable thereon, means for shifting the said hanger, a table, a pattern-carrying frame suspended from the under side of the said horizontally-shiftable hanger, a pair of oppositely-arranged carriages adjustably carried by said pattern-carrying frame, and means for causing a relative rotation between the table and the pattern-carrying frame, substantially as set forth.

11. In a gear-molding machine, a stationary table, an elevated shiftable hanger-frame, a revoluble pattern-carrying frame, suspended from beneath the hanger-frame and having a journal connection therewith, and pattern-carriages adjustably suspended from the pattern-carrying frame, substantially as set forth.

12. In a gear-molding machine, the combination with a stationary table, of an elevated horizontally-shiftable hanger, a revoluble pattern-carrying frame suspended from beneath the hanger and having a journal connection therewith, and independently-adjustable pattern-carriages suspended from said frame, substantially as set forth.

13. In a gear-molding machine, the table, an elevated stationary support, a separate shiftable hanger horizontally movable upon said support, and a revoluble pattern-carrying frame having a journal connection with said hanger, and suspended from and swinging beneath the latter, substantially as set forth.

14. In a gear-molding machine, an elevated stationary support, a separate horizontally-shiftable top hanger-frame movable upon said support, shifting mechanism having an operative connection with said hanger-frame, a revoluble pattern-carrying frame having a journal connection with said hanger-frame, and suspended from and swinging beneath the latter, and pattern-carriages suspended from said pattern-carrying frame, substantially as set forth.

15. In a gear-molding machine, the table, elevated stationary supporting-beams arranged above the table, a horizontally-shiftable hanger-frame slidable upon said beams and carrying running-nuts, shifting-screws arranged longitudinally of said beams and engaging the running-nuts of the hanger-frame, drive-gearing for said shifting-screws, and a revoluble pattern-carrying frame having a journal connection with said hanger-frame, the said revoluble pattern-carrying frame being arranged to be suspended from and to swing beneath the under side of the hanger-frame, substantially as set forth.

16. In a gear-molding machine, the table, elevated stationary supporting-beams arranged above the table and provided with longitudinal ways, a horizontally-shiftable hanger-frame carrying a plurality of running-nuts working in the ways of the supporting-beams, shifting-screws arranged longitudinally of the supporting-beams and engaging said nuts of the hanger-frame, drive-gearing for said shifting-screws, and a revoluble pattern-carrying frame having a journal connection with said hanger-frame, the said revoluble pattern-carrying frame being arranged to be suspended from and to swing beneath the under side of the hanger-frame, substantially as set forth.

17. In a gear-molding machine, the table, elevated stationary supporting-beams arranged above the table and provided with longitudinal ways, a shiftable spider hanger-frame, provided with a plurality of slide-arms extending over the supporting-beams and carrying running-nuts working in the ways thereof, shifting-screws arranged longitudinally of the supporting-beams and engaging the ends of the spider hanger-frame, drive-gearing for the shifting-screws, and a revoluble pattern-carrying frame having a journal connection with said hanger-frame, the said revoluble pattern-carrying frame being arranged to be suspended from and to swing beneath the under side of the hanger-frame, substantially as set forth.

18. In a gear-molding machine, the table, an elevated stationary support arranged above the table, a separate hanger-frame arranged upon the elevated support and provided with a central pendent bearing, and a revoluble pattern-carrying frame having a central journal mounted in the pendent bearing of the hanger-frame, the said revoluble pattern-carrying frame being arranged to be suspended from and to swing beneath the under side of the hanger-frame, substantially as set forth.

19. In a gear-molding machine, the table, an elevated stationary support arranged above the table, a horizontally-shiftable hanger-frame arranged upon the elevated support and provided with a central pendent bearing, and a revoluble pattern-carrying frame having a central journal mounted in the pendent bearing of the hanger-frame, the said revoluble pattern-carrying frame being arranged to be suspended from and to swing beneath the under side of the hanger-frame, substantially as set forth.

20. In a gear-molding machine, the table, an elevated stationary support arranged above the table, a hanger-frame arranged upon said support and provided with a pendent cylindrical bearing-shell, a revoluble pattern-carrying frame having a central cylindrical journal registering within said bearing-shell, the pattern-carrying frame being arranged to be suspended from and to swing horizontally beneath the hanger-frame, and fastening means detachably connecting the revoluble pattern-carrying frame with the hanger-frame, substantially as set forth.

21. In a gear-molding machine, the table, an elevated stationary support arranged above the table, a separate top hanger-frame shiftable upon the elevated support in a rectilinear path, said hanger-frame being provided with an elongated pendent cylindrical bearing-shell, a revoluble pattern-carrying frame having a cylindrical journal portion registering within the bearing-shell of the hanger-frame, the said pattern-carrying frame being arranged to swing horizontally beneath the hanger-frame upon its journal connection as an axis, and means, carried by the pattern-carrying frame, for rotating the same upon the hanger-frame, substantially as set forth.

22. In a gear-molding machine, an elevated hanger-frame provided with an elongated pendent cylindrical bearing-shell, a revoluble pattern-carrying frame having a cylindrical journal portion registering in the bearing-shell and provided with a retaining-ring engaging the upper end of said shell, and a central king-bolt between the hanger-frame and the journal portion of the pattern-carrying frame, substantially as set forth.

23. In a gear-molding machine, the table, an elevated hanger-frame having a pendent cylindrical bearing-shell, a revoluble pattern-carrying frame having a journal portion registering in said bearing-shell, and a king-bolt connection between the hanger-frame and the journal portion of the pattern-carrying frame, substantially as set forth.

24. In a gear-molding machine, the combination with a stationary table, of an elevated hanger-frame having a pendent bearing-shell carrying a stationary master-gear, a revoluble pattern-carrying frame arranged for suspension beneath the under side of the hanger-frame and having a journal portion working in the said bearing-shell, and means, carried by the pattern-frame, coöperating with the master-gear to provide for rotating the pattern-frame, substantially as set forth.

25. In a gear-molding machine, the table, an elevated hanger-frame having a pendent cylindrical bearing-shell, a stationary master worm gear-wheel fitted to the lower end of the bearing-shell, a revoluble pattern-carrying frame having a central journal portion working in the bearing-shell of the hanger-frame, and operating devices supported by the pattern-carrying frame and including a feed-worm having a traveling engagement with the master worm gear-wheel, substantially as set forth.

26. In a gear-molding machine, the table, an elevated hanger-frame having a pendent cylindrical bearing-shell, a stationary master worm gear-wheel fitted to the lower end of said bearing-shell, a pattern-carrying frame having a central journal portion registering in said bearing-shell, and also provided with a circular gear case or housing encircling the stationary master worm gear-wheel, and operating devices, supported by the pattern-carrying frame and including a feed-worm having a traveling engagement with the master worm gear-wheel, substantially as set forth.

27. In a gear-molding machine, the table, an elevated hanger-frame having a pendent cylindrical bearing-shell, a stationary master worm gear-wheel fitted to the lower end of the bearing-shell, a revoluble pattern-carrying frame provided with a central journal portion registering in said bearing-shell and also having an upstanding gear case or boxing encircling the master worm gear-wheel, said gear case or boxing having an extension at one side, and operating devices supported by the pattern-carrying frame and including a feed-worm housed within the extension of the case or boxing, and having a traveling engagement with the periphery of the master worm gear-wheel, substantially as set forth.

28. In a gear-molding machine, the table, an elevated hanger-frame having a pendent bearing-shell, a stationary master worm gear-wheel fitted to said bearing-shell, a revoluble pattern-carrying frame having a journal portion registering within the bearing-shell and also having a gear case or boxing encircling the master-wheel, and provided at one side with a bearing-bracket extension, a bearing-bracket fitted in said extension of the gear case or boxing, and operating devices supported by the pattern-carrying frame and including a feed-shaft working in said bearing-bracket and carrying a worm arranged within the bearing-bracket extension and having a traveling engagement with the worm gear-wheel, substantially as set forth.

29. In a gear-molding machine, the table, an elevated hanger-frame carrying a stationary master worm gear-wheel, a revoluble pattern-carrying frame having a journal connection with the hanger-frame and provided with an offset hanger-bracket, the revoluble pattern-carrying frame being arranged to be suspended from and to swing horizontally beneath the under side of said hanger-frame, and operating devices supported by the pattern-carrying frame and including a feed-worm having a traveling engagement with the master worm gear-wheel, and lever-controlled actuating means carried by said offset hanger-bracket, substantially as set forth.

30. In a gear-molding machine, the table, an elevated hanger-frame carrying a stationary master worm gear-wheel, a revoluble pattern-carrying frame having a journal connection with the hanger-frame and provided at or contiguous to one end with an offset hanger-bracket, the revoluble pattern-carrying frame being arranged to be suspended from and to swing horizontally beneath the under side of said hanger-frame, and turning mechanism for the pattern-carrying frame comprising a feed-shaft carrying a traveling worm meshing with the master worm gear-wheel, an operating-shaft having a changeable-gear connection with said worm feed-shaft, and lever-controlled actuating means carried by said offset hanger-bracket and operatively connected with said operating-shaft, substantially as described.

31. In a gear-molding machine, the table, the pattern-carrying frame arranged above the table and having a longitudinal slideway at its under side, a pair of pattern-carriages engaging with said slideway and arranged respectively at diametrically-opposite sides of the point of support for the pattern-carrying frame, similar individual adjusting mechanism for each carriage, a pair of inner and outer vertically-movable patterns supported by each carriage, and similar individual adjusting mechanism for each pattern, substantially as set forth.

32. In a gear-molding machine, the stationary table, a revoluble pattern-carrying frame supported above the table and provided at its under side with a longitudinal slideway consisting of parallel-spaced guide-strips having upstanding ribs or tongues, and individually-adjustable pattern-carriages pendent from the carrying-frame and having at their upper ends slide-heads provided with grooved under sides slidably interlocking with said ribs or tongues of the guide-strips, substantially as set forth.

33. In a gear-molding machine, the stationary table, an elevated hanger, a revoluble pattern-carrying frame suspended from the under side of the said hanger and having a journal connection therewith, said pattern-carrying frame being provided at its under side with a longitudinal slideway, a pendent pattern-carriage slidably suspended from said slideway, said pattern-carriage having individual feed mechanism including a revoluble feed-nut, and a stationary feed-screw supported by the carrying-frame and engaged by said feed-nut.

34. In a gear-molding machine, the table, a pattern-carrying frame supported above the table and provided with a slideway, a stationary feed-screw supported by the pattern-carrying frame, a pendent pattern-carriage suspended from said slideway, said carriage having individual feed mechanism including a revoluble feed-nut working upon the stationary feed-screw, and adjustable stops arranged to limit the play of the carriage, substantially as set forth.

35. In a gear-molding machine, the table, the pattern-carrying frame supported above the table, a common stationary carriage-feed screw supported by said pattern-carrying frame, pendent pattern-carriages slidably suspended from the carrying-frame, each carriage having feed mechanism including a revoluble feed-nut working upon the said feed-screw, and individually-adjustable patterns, supported by each carriage, substantially as set forth.

36. In a gear-molding machine, the table, the pattern-carrying frame supported above the table, a pendent pattern-carriage slidably suspended from the carrying-frame, individual feed mechanism for the carriage having a controlling hand-wheel disposed at one side thereof, and separate patterns supported by the carriage and having individual adjusting mechanism provided with controlling hand-wheels exposed at the opposite side of the carriage, substantially as set forth.

37. In a gear-molding machine, the table, a pattern-carrying frame supported above the table, a stationary feed-screw fitted to the pattern-carrying frame, a pendent carriage slidably suspended from the pattern-carrying frame, a carriage-feed mechanism comprising a revoluble gear-carrying bushing supported in an upright position within the carriage-casing and carrying gear-wheels upon opposite ends, a short operating-shaft carrying an exterior controlling hand-wheel and an interior gear meshing with that at the lower end of the gear-carrying bushing, and a revoluble feed-nut working upon the stationary feed-screw and carrying a gear meshing with that at the upper end of said gear-carrying bushing, substantially as set forth.

38. In a gear-molding machine, the table, the pattern-carrying frame, a pattern-carriage adjustably supported by the frame, a pair of vertically-movable patterns supported by the carriage and arranged respectively for internal and external gearwork, and individual adjusting mechanism for each pattern including an adjusting-screw connected with the pattern-support, and a suitably-rotated, fixedly-positioned feed nut or bushing engaging said screw, substantially as set forth.

39. In a gear-molding machine, the table, a pattern-carrying frame, a pattern-carriage adjustably supported by the carrying-frame, said carriage being provided at the front and rear sides thereof with vertical guideways, pattern-holding slides working in said guideways and carrying non-rotating adjusting-screws, feed-nuts supported in fixed positions and engaging with said adjusting-screws, and means for rotating said feed-nuts in either direction, substantially as set forth.

40. In a gear-molding machine, the pattern-carrying frame, a pattern-carriage adjustably supported by said frame and provided at the front and rear sides thereof with vertical guideways, vertically-adjustable pattern-holding slides working in said guideways, and carrying vertically-arranged adjusting-screws, pattern-operating shafts mounted in the carriage and carrying exterior controlling hand-wheels, and a pair of intermeshing spiral gears associated with each adjusting-screw and the operating-shaft therefor, one of said gears carrying an interior-threaded portion engaging with the adjusting-screw, substantially as set forth.

41. In a gear-molding machine, the combination with the machine-base, of a flask-supporting table separate from the base and detachably resting thereon, an elevating rim or annulus removably interposed between the base and the said table, and a pattern-carrying mechanism arranged above the table, substantially as set forth.

42. In a gear-molding machine, the combination with the machine-base, of a flask-supporting table separate from the base and removably resting thereon, and an elevating rim or annulus removably interposed between the base and the table and having an interlocking engagement therewith, substantially as set forth.

In testimony that I claim the foregoing as my own I have hereto affixed my signature in the presence of two witnesses.

FERDINAND KEPP.

Witnesses:
LILLIE V. J. BERNY,
FRANK VENORKA.